(12) United States Patent
Yoeda et al.

(10) Patent No.: US 6,405,693 B2
(45) Date of Patent: Jun. 18, 2002

(54) INTERNAL COMBUSTION ENGINE AND METHOD FOR CONTROLLING VALVE OF INTERNAL COMBUSTION ENGINE

(75) Inventors: Keiji Yoeda, Numazu; Kiyoshi Nakanishi, Susono; Yoshihiro Iwashita, Suntou; Kazuhiko Shiratani, Susono; Shouji Katsumata, Gotemba; Makoto Ogiso, Susono; Hideyuki Nishida, Susono; Tomomi Yamada, Susono; Isao Matsumoto, Susono; Masaaki Tanaka, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/791,573

(22) Filed: Feb. 26, 2001

(30) Foreign Application Priority Data

Feb. 28, 2000 (JP) .......................... 2000-051918
Apr. 21, 2000 (JP) .......................... 2000-121590

(51) Int. Cl.⁷ .................................................. F01L 1/34
(52) U.S. Cl. ................................. 123/90.15; 123/90.11; 251/129.01

(58) Field of Search ........................ 123/90.11, 90.15, 123/90.6, 432

(56) References Cited

U.S. PATENT DOCUMENTS 4,552,112 A * 11/1985 Nagao et al.

FOREIGN PATENT DOCUMENTS

| JP | 7-111127 | 11/1995 |
|---|---|---|
| JP | 8-200025 | 8/1996 |
| JP | 2000-130194 | * 5/2000 |

* cited by examiner

Primary Examiner—Thomas Denion
Assistant Examiner—Sean D. O'Brien
(74) Attorney, Agent, or Firm—Oliff & Berridge, PLC

(57) ABSTRACT

An internal combustion engine includes two intake side solenoid driving valve mechanisms for opening and closing intake valves by cooperation of an electromagnetic coil and a spring, and/or two exhaust side solenoid driving valve mechanisms for opening and closing exhaust valves provided on each cylinder. A controller commands a driving circuit to cause the valve-opening timing of the exhaust valves or the intake valves to be different.

14 Claims, 10 Drawing Sheets

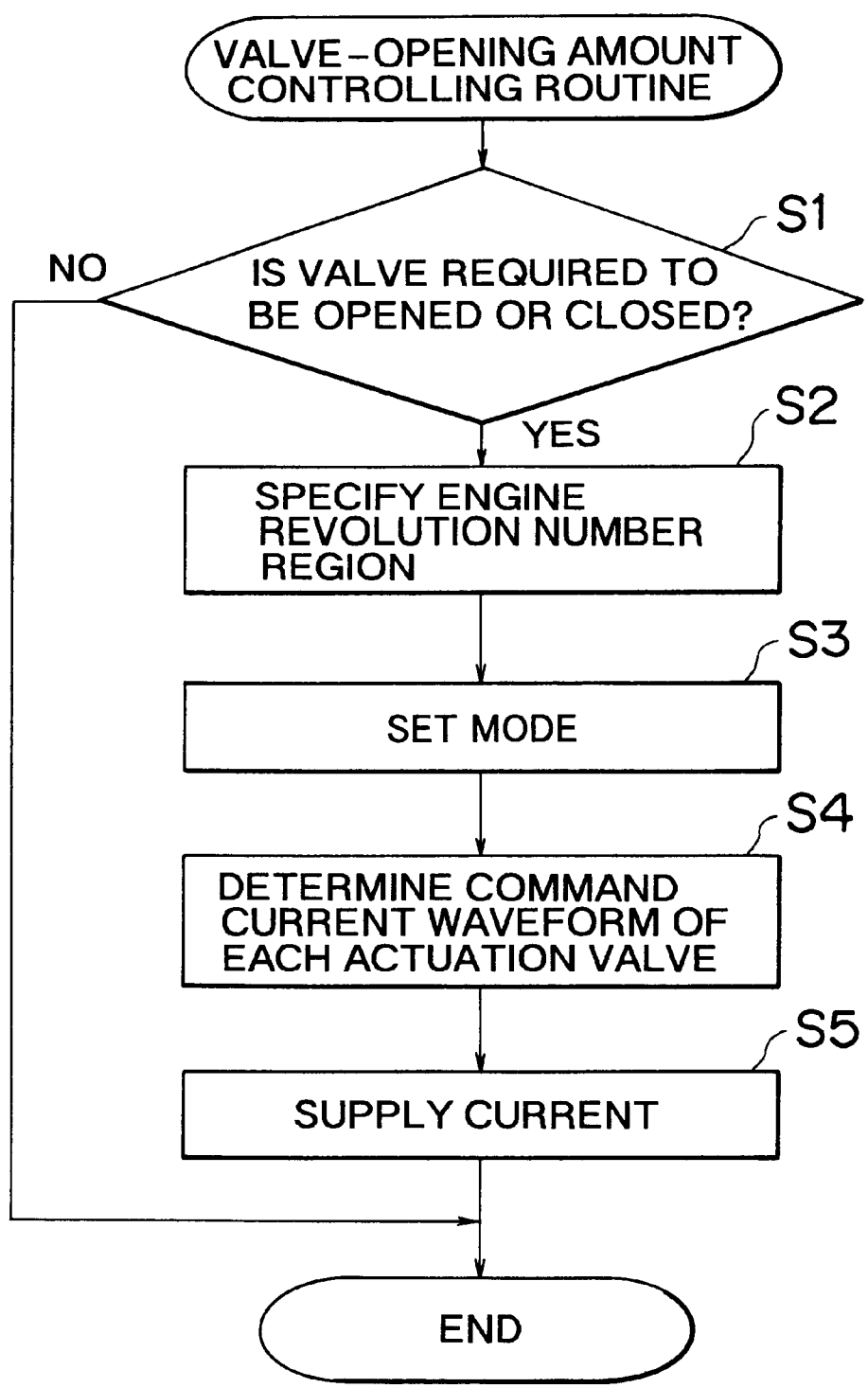

INTERNAL COMBUSTION ENGINE AND METHOD FOR CONTROLLING VALVE OF INTERNAL COMBUSTION ENGINE

INCORPORATION BY REFERENCE

The disclosure of Japanese Patent Application Nos. 2000-51918 filed on Feb. 28, 2000 and 2000-121590 filed on Apr. 21, 2000 including the specifications, drawings and abstracts are incorporated herein by reference in their entireties.

BACKGROUND OF THE INVENTION

1. Field of Invention

The invention relates to an internal combustion engine, and more particularly, to an internal combustion engine having a plurality of intake valves or exhaust valves in the same cylinder and capable of controlling valve-opening timing of the intake valves or the exhaust valves, and also relates to a method for controlling the intake valves or the exhaust valves.

2. Description of Related Art

As an internal combustion engine of this kind, Japanese Patent Publication No. 7-111127 discloses an internal combustion engine having a solenoid driving valve mechanism for directly driving an exhaust valve by cooperation of an electromagnetic force of an electromagnet and a spring force of a spring. This solenoid driving valve mechanism biases a shaft body which moves linearly (a lift operation) together with a valve body from opposite sides in its moving direction by means of springs to hold this shaft body together with the moving valve body at a predetermined position (neutral position). The solenoid driving valve mechanism allows the shaft body (valve body) to generate natural vibration, and applies an electromagnetic force to the shaft body from the opposite sides in its moving direction, thereby controlling the motion state of the shaft body and controlling the opening and closing timing and opening amount (lift amount) of each the valve body.

The internal combustion engine having the intake valves or exhaust valves as so-called solenoid driving valves drives and controls individual exhaust valves independently unlike an internal combustion engine of a type (cam type, hereinafter) in which intake valves are opened and closed as camshafts connected to crankshafts through belts are rotated. Therefore, the former internal combustion engine has more excellent characteristics in terms of opening and closing timing (valve timing) of each valve, flexibility in control when the acting angle is changed, and response of valve action when the valve is moved to a desired lift position.

In a solenoid driving valve in which the basic action of a valve body is determined by armature natural vibration generated by spring force of a spring as described above, a displacement speed of the valve body corresponding to a specific amplitude is basically determined by mechanical characteristics (the spring constant) of the spring. On the other hand, in order for the internal combustion engine to obtain an excellent driving state when operating in a wide revolution number region, it is at least necessary to open and close the valve at sufficiently high speed with respect to the high revolution number. As a result, the mechanical characteristics of the spring are usually selected such that the characteristics correspond to the displacement speed of the valve body which can follow the high revolution number.

Furthermore, in the cam type internal combustion engine, since the revolution speed of the camshaft is reduced as the revolution number of the engine is reduced, the opening and closing speed of the exhaust valve is slow in the low revolution number region.

However, in an internal combustion engine having the solenoid driving valve, if the exhaust valve is opened and closed over all revolution number regions at the displacement speed of the valve which is set to be suitable for the high revolution number region of the engine, noise due to exhaust pulsation of the intake and exhaust valves is increased in the low revolution number region of the engine as compared with the cam type internal combustion engine. Although the cycle of exhaust pulsation becomes long as the engine revolution number is reduced, the opening speed of the exhaust valve is not changed as it is. Therefore, as the engine revolution number is reduced, the discharging speed (flow velocity) becomes relatively greater as compared with the cam type internal combustion engine.

Further, in some internal combustion engines, the angle of action of each of the intake and exhaust valves can be varied, and the intake characteristics or exhaust characteristics can be varied by varying the angle of action.

For example, Japanese Patent Application Laid-open No. 8-200025 discloses an internal combustion engine having a plurality of exhaust valves in one cylinder in which the angles of action of the exhaust valves can be varied in accordance with the driving state of the internal combustion engine.

In the internal combustion engine disclosed in Japanese Patent Application Laid-open No. 8-200025, however, the angles of action of the exhaust valves are not continuously variable. Even if the exhaust valves are opened at different valve-opening timings, since there is only one relative offset of the valve-opening timing, it is not possible to arbitrarily set the angles of action of the exhaust valves.

SUMMARY OF THE INVENTION

The invention has been made in view of the above circumstances, and it is an object of the invention to provide an internal combustion engine that is capable of appropriately controlling the valve-opening timing of a plurality of intake valves or exhaust valves disposed in one cylinder. In particular, it is an object of the invention to provide an internal combustion engine that is capable of appropriately controlling the relative valve-opening timing between exhaust valves in medium and low engine revolution number regions, and to provide an internal combustion engine capable of setting the angle of action of the intake valves or exhaust valves.

To achieve the above and/or other objects, an internal combustion engine according to a first aspect of the invention includes a plurality of electromagnetically driven exhaust valves in the same cylinder, and a valve-opening timing interval between the exhaust valves is controlled in accordance with the engine revolution number of the internal combustion engine.

In the case of an internal combustion engine, the considerations involved in actuating the exhaust valve differs depending upon the engine revolution number of the engine. For example, in a high revolution number region, the ability to follow (i.e., keep up with) the high speed revolution of the engine output shaft and fast speed for discharging the exhaust gas are required. On the other hand, in a medium and low revolution number region, it is preferable to gently discharge the exhaust gas in order to suppress pulsation of exhaust gas discharged from the combustion chamber. In the case of a solenoid driving valve, because of its mechanical characteristics, it is basically preferable to maintain a constant moving speed of the valve body, i.e., the opening and closing operation speed of the valve body.

According to this aspect of the invention, it is possible to vary the opening speed of the discharge port of exhaust gas without changing the moving speed of each valve body by controlling the interval of valve-opening timing of the exhaust valves. If a case in which the plurality of exhaust valves are opened simultaneously and a case in which the exhaust valves are opened successively with different timings are compared with each other, for example, the discharge port for the exhaust gas can be gently opened in the latter case.

Further, a difference in timing between an exhaust valve having the fastest valve-opening timing and an exhaust valve having the slowest valve-opening timing may be set to increase as the engine revolution number of the internal combustion engine becomes smaller (i.e., decreases).

In the medium and low revolution region, it is preferable to gently discharge the exhaust gas from the combustion chamber in order to suppress the exhaust pulsation.

According to this aspect of the invention, as the engine revolution number becomes smaller, the exhaust gas is discharged more gently, and the exhaust pulsation is suitably restrained. Therefore, the quietness of the engine especially in the low and medium revolution regions is improved.

When the engine revolution number of the internal combustion engine is equal to or smaller than a predetermined revolution number, the relative valve-opening timing of the exhaust valves may be different.

According to this aspect also, the exhaust pulsation is suitably restrained, and the quietness of the engine especially in the same region is improved.

An internal combustion engine according to a second aspect of the invention determines a target angle of action of a plurality of valves provided in the same cylinder, controls the valve-opening timing interval of the valves provided in the same cylinder, and controls the angle of action of the valves to the target angle of action by controlling the valve-opening timing interval of the individual valves.

In this internal combustion engine, two valves are opened and closed with different valve-opening timings. In this case, the effective valve-opening period for that combustion chamber (cylinder) is a period from an instant when one valve which opened first starts opening to an instant when the other valve which opened later finishes closing. This enables the angle of action to be freely set and controlled. Therefore, the flexibility in design of the angle of action of the valve can be enhanced.

In the internal combustion engine of an aspect of the invention, a relative delay amount of the valve-opening timing of the valves for a cylinder may be obtained based on the determined target angle of action, and the interval of the valve-opening timing of the two driving valves may be controlled according to that delay amount.

In the internal combustion engine of an aspect of the invention, only when the target angle of action is smaller than a predetermined value, the valve-opening timing interval of the valves may be controlled so as to differ.

In the internal combustion engine of an aspect of the invention, the plurality of driving valves whose valve-opening timing is controlled can be controlled such that the valve operations thereof are shifted to the valve-closing operation immediately before the valves reach the fully open positions. With this structure, a small angle of action which could not be conventionally set can also be set as the angle of action.

The invention is not limited to the above-described internal combustion engine. The invention applies to a vehicle in which the internal combustion engine of the invention is mounted, and to a method for controlling the valve-opening timing of valves provided in the internal combustion engine.

BRIEF DESCRIPTION OF THE DRAWINGS

The invention will be described in conjunction with the following drawings in which like reference numerals designate like elements and wherein:

FIG. 6 is a flowchart showing a valve-opening amount controlling procedure according to a first embodiment of the invention;

DETAILED DESCRIPTION OF PREFERRED EMBODIMENTS

A first embodiment in which the invention is applied to an internal combustion engine having a solenoid driving valve will be explained with reference to FIGS. 1 to 7.

Figure 1:
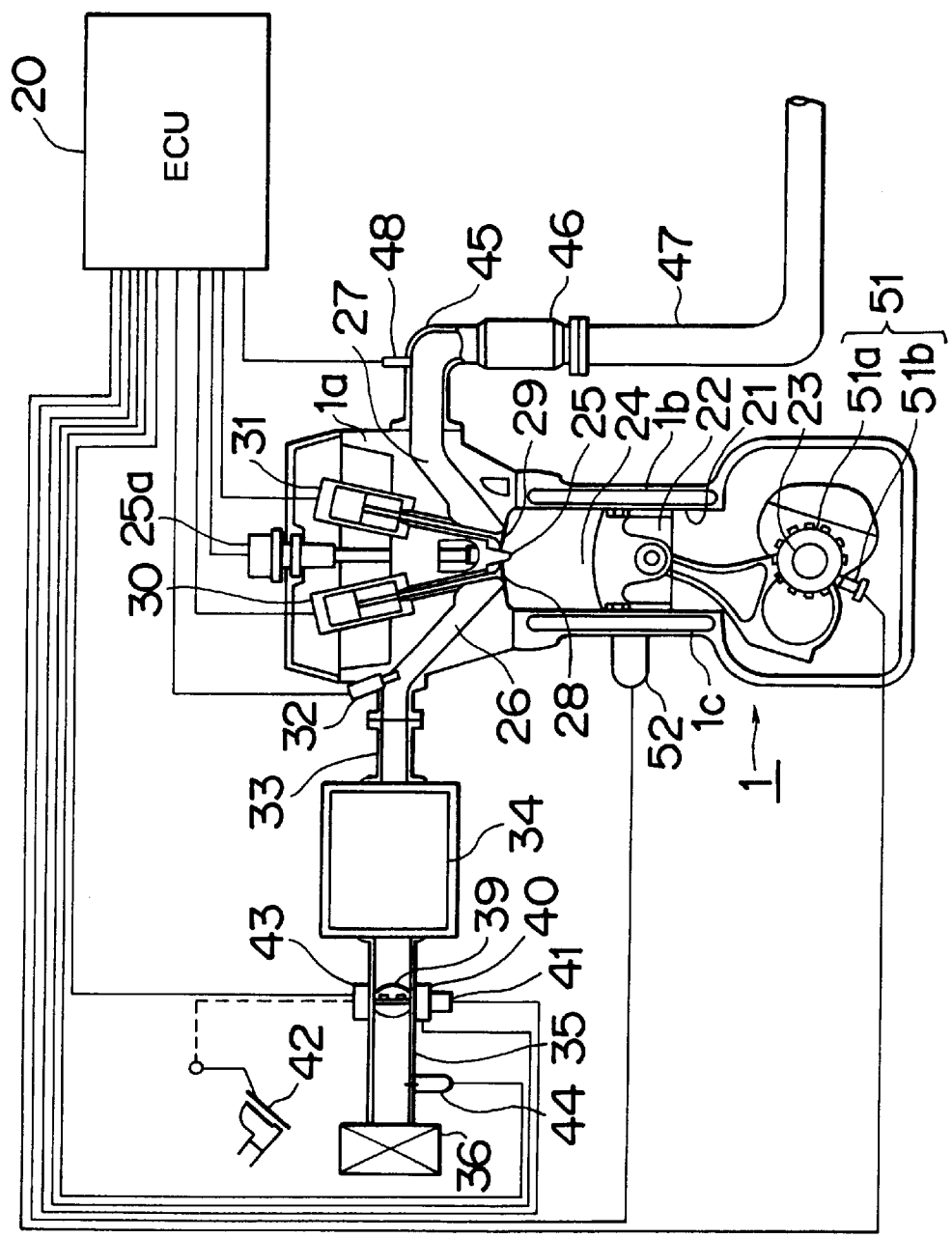
FIG. 1 is a schematic diagram showing a structure of one embodiment of an internal combustion engine having a solenoid driving valve of the invention.

FIG. 1 schematically shows a structure of the internal combustion engine having the solenoid driving valve according to this embodiment. The internal combustion engine 1 includes a plurality of cylinders 21, and is a gasoline engine for repeating a four-stroke cycle, that is, intake stroke, compression stroke, combustion and expansion stroke and exhaust stroke, to obtain engine output.

The internal combustion engine 1 includes a cylinder block 1b in which the plurality of cylinders 21 and a cooling water passage 1c are formed. In addition, a cylinder head 1a fixed to an upper portion of the cylinder block 1b.

A crankshaft 23 which is an engine output shaft is rotatably supported in the cylinder block 1b. The crankshaft 23 is connected to a piston 22 slidably received in each of the cylinders 21.

A combustion chamber 24 surrounded by a top face of the piston 22 and a wall face of the cylinder head 1a is formed above the piston 22. A spark plug 25 is mounted to the cylinder head 1a so as to face the combustion chamber 24. An ignitor 25a is connected to the spark plug 25 for providing driving current to the spark plug 25.

Open ends of two intake ports 26 and open ends of exhaust ports 27 are formed in the cylinder head 1a so as to face the combustion chamber 24. The intake ports 26 are in communication with open ends of intake branch tubes 33 mounted to the cylinder head 1a of the internal combustion engine 1. A fuel injection valve 32 is mounted to the cylinder head 1a such that an injection hole thereof projects toward the intake port 26. The fuel injection valve 32 injects and supplies fuel (gasoline) sent from a fuel tank (not shown) through a booster pump (not shown) into the intake ports 26 (in a direction toward the combustion chamber 24). The intake branch tube 33 is connected to a surge tank 34 for suppressing intake pulsation. An intake pipe 35 is connected to the surge tank 34, and an air cleaner box 36 for removing dust and dirt in the intake air is connected to the intake pipe 35.

An air flowmeter 44 that outputs an electric signal corresponding to a mass of air (intake air mass) flowing in the intake pipe 35 is mounted to the intake pipe 35. A throttle valve 39 for adjusting the amount of flow of intake air flowing in the intake pipe 35 is provided at a portion in the intake pipe 35 downstream from the air flowmeter 44.

Mounted to the throttle valve 39 are a throttle actuator 40 including a step motor or the like for opening and closing the throttle valve 39 in accordance with the magnitude of applied electric power, a throttle position sensor 41 that outputs an electric signal corresponding to opening of the throttle valve 39, and an accelerator pedal position sensor 43 mechanically connected to an accelerator pedal 42 to output an electric signal corresponding to an operation amount of the accelerator pedal 42.

Each of the exhaust ports 27 of the internal combustion engine 1 is in communication with each branch pipe of an exhaust branch pipe 45 mounted to the cylinder head 1a. The exhaust branch pipe 45 is connected to an exhaust pipe 47 through an exhaust emission control catalyst 46, and the exhaust pipe 47 is connected to a muffler (not shown) at a downstream end thereof.

An air/fuel ratio sensor 48 that outputs an electric signal corresponding to an air/fuel ratio of exhaust gas flowing in the exhaust branch pipe 45, i.e., an air/fuel ratio of exhaust gas flowing into the exhaust emission control catalyst 46, is mounted to the exhaust branch pipe 45.

The exhaust emission control catalyst 46 is one of or a combination of the following catalysts: a three way catalyst for purifying hydrocarbon (HC), carbon monoxide (CO) and nitrogen oxide (NOx) included in exhaust gas when the air/fuel ratio of exhaust gas flowing into the exhaust emission control catalyst 46 is equal to a predetermined air/fuel ratio near a theoretical air/fuel ratio; an absorption reduction type NOx catalyst which absorbs nitrogen oxide (NOx) included in the exhaust gas when the air/fuel ratio of exhaust gas flowing into the exhaust emission control catalyst 46 is a lean air/fuel ratio and which reduces and purifies the exhaust gas while discharging the previously absorbed nitrogen oxide (NOx) when the air/fuel ratio of the flow-in exhaust gas is the theoretical air/fuel ratio or a rich air/fuel ratio; and a selection reduction type NOx catalyst for reducing and purifying nitrogen oxide (NOx) when the air/fuel ratio of the exhaust gas flowing into the exhaust emission control catalyst 46 is in an oxygen-excessive state and a predetermined reducing agent exists.

A crank position sensor 51 includes a timing rotor 51a mounted to an end of the crankshaft 23 and an electromagnetic pickup 51b mounted to the cylinder block 1b near the timing rotor 51a. The crank position sensor 51 indicates the crank angle and the engine revolution number NE by outputting an electric signal corresponding to a rotation phase of the crankshaft 23. A water temperature sensor 52 mounted to the cylinder block 1b detects a temperature of cooling water flowing through the cooling water passage 1c formed in the internal combustion engine 1.

Each of the intake ports 26 is opened and closed by a solenoid driving valve (intake valve) 28 supported by the cylinder head 1a such that the solenoid driving valve 28 can advance and retreat. Each of the intake valves 28 is opened and closed by a solenoid driving valve mechanism (intake side solenoid driving valve mechanism, hereinafter) 30 provided on the cylinder head 1a.

Each of the exhaust ports 27 is opened and closed by a solenoid driving valve (exhaust valve) 29 supported by the cylinder head 1a such that the solenoid driving valve 29 can advance and retreat. Each of the exhaust valves 29 is opened and closed by a solenoid driving valve mechanism (exhaust side solenoid driving valve mechanism, hereinafter) 31 provided on the cylinder head 1a.

A specific structure of each of the intake side solenoid driving valve mechanisms 30 and the exhaust side solenoid driving valve mechanisms 31 will be explained in detail. The intake side solenoid driving valve mechanism 30 and the exhaust side solenoid driving valve mechanism 31 have the same structure; therefore, only the exhaust side solenoid driving valve mechanism 31 will be explained.

Figure 2:
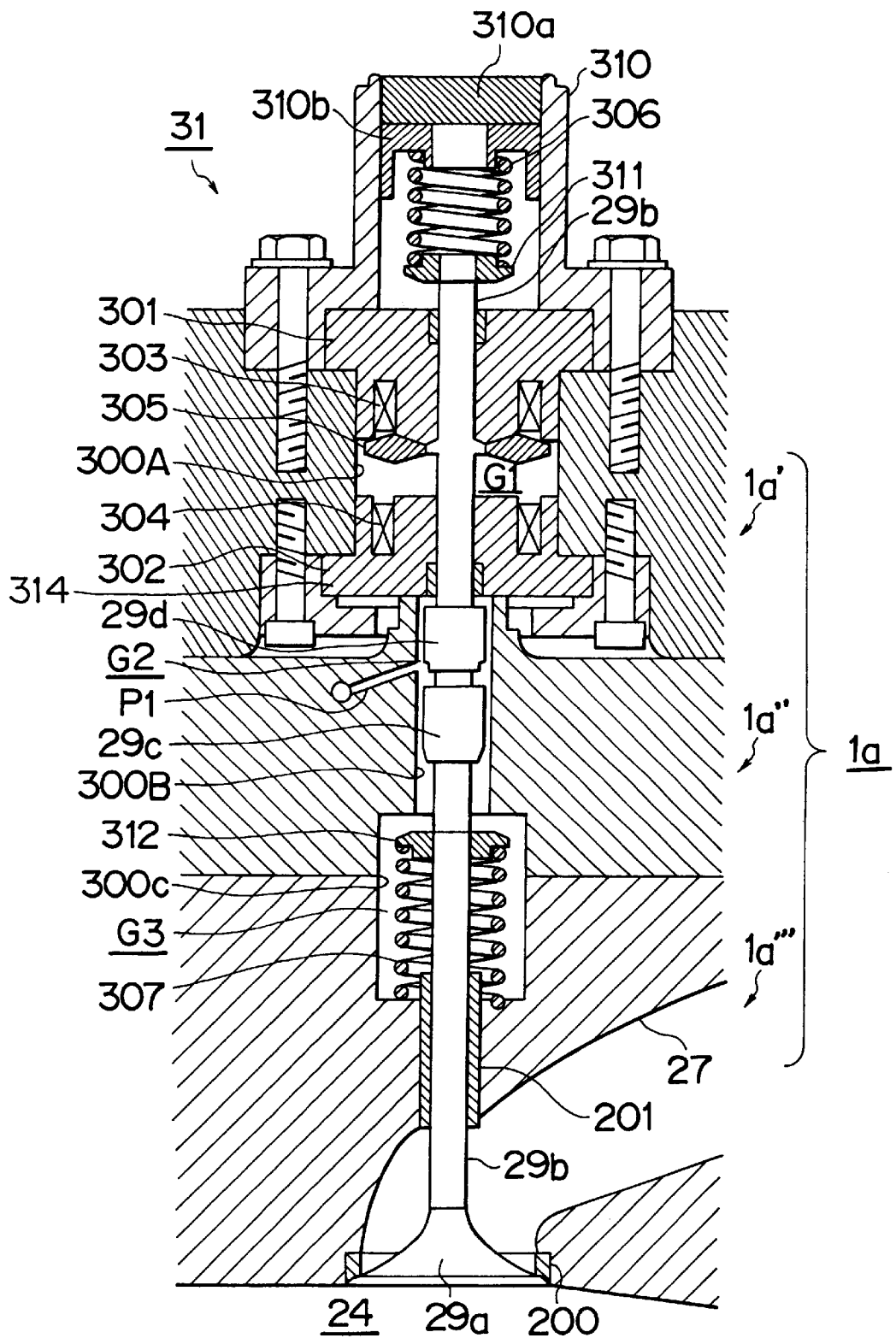
FIG. 2 is a side sectional view showing an internal structure of the solenoid driving valve mechanism.

FIG. 2 is a schematic side view of an internal structure of the exhaust side solenoid driving valve mechanism 31.

As shown in FIG. 2, in the exhaust side solenoid driving valve mechanism 31, a through hole is formed from a top face of the cylinder head 1a to the combustion chamber 24 (exhaust port 27), an exhaust valve 29 is integrally provided with a shaft body and a valve body, and a shaft body portion of the exhaust valve 29 is incorporated in the through hole. The shaft body portion is allowed to reciprocate linearly within the through hole, thereby opening and closing the open end of the exhaust port 27 which faces the combustion chamber 24.

First, the cylinder head 1a includes an upper layer member (upper head) 1a', a middle layer member (middle head) 1a'', and a lower layer member (lower head) 1a''' which are laminated (stacked) on one another from the top face of the cylinder head 1a toward the combustion chamber 24. Thus, the through hole formed from the top face of the cylinder head 1a to the exhaust port 27 and through which the shaft body reciprocates includes three holes passing through these three layers.

Of those three holes, a hole 300A formed in the upper head 1a' is provided with a first core (upper stage) 301 and a second core (lower stage) 302 incorporated from upper and lower faces of the upper layer member 1a'. The shaft body (valve shaft) 29b of the exhaust valve 29 is supported in a state in which the shaft body 29b is surrounded by the first core 301 and the second core 302, and an upper end of the shaft body 29b extends from an upper face of the first core 301. A valve-driving body (armature) 305 provided on a periphery of the valve shaft 29b exists in a gap G1 provided between the first core 301 and the second core 302. The armature 305 includes a disc-like soft magnetic material. A first electromagnetic coil 303 is mounted in a groove formed in an end face of the first core 301 close to the gap G1, and a second electromagnetic coil 304 is mounted in a groove formed in an end face of the second core 302 close to the gap G1. The first electromagnetic coil 303 and the second electromagnetic coil 304 are opposed to each other so as to sandwich the gap G1 therebetween. The first and second electromagnetic coils 303 and 304 are electrically connected to an exhaust side driving circuit 31b.

A cylindrical upper cap 310 formed at its lower end with a flange is fastened to a top face of the upper head 1a' by means of bolts so as to cover the first core 301 with the flange of the upper cap 310. An upper end of the upper cap 310 is closed with a cylindrical lid 310a having an outer diameter that is the same as an inner diameter of a cylindrical opening of the upper cap 310. The lid 310a is mounted by threadedly engaging an outer peripheral face of the lid 310a with an inner peripheral face of the upper cap 310. A holding member 310b and a first spring 306 whose upper end is held by the holding member 310b are incorporated in a lower face of the lid 310a of the upper cap 310. A lower end of the first spring 306 abuts against an upper retainer 311 fixed to an upper end of the valve shaft 29b, thereby biasing the upper retainer 311 (and the valve shaft 29b) toward the combustion chamber 24. That is, the first spring 306 biases the exhaust valve 29 in its opening direction (downward in FIG. 2).

A lower cap 314 including an annular body having an outer diameter that is substantially equal to a diameter of the hole 300A formed in the upper head 1a' is mounted to a lower portion of the second core 302. The lower cap 314 is fastened to the upper head 1a' by means of bolts in a state in which the lower cap 314 abuts against a lower peripheral portion of the second core 302. With this design, the second core 302 is fixed to the lower cap 314.

In the hole 300B passing through the middle head 1a", the valve shaft 29b of the exhaust valve 29 is separated into two shaft bodies respectively extending toward the upper head 1a' and the lower head 1a'". During operation of the engine, the valve shaft 29b extends due to thermal expansion, which if not compensated for, deteriorates its sealing performance as a valve. However, such sealing performance deterioration is prevented because the separated portions exist. A lash adjuster 29c is provided on an end of the shaft body extending toward the lower head at portions where the separated opposite shaft bodies oppose each other. The lash adjuster 29c is accommodated in a predetermined gap G2 secured in the hole 300B together with a cap 29d provided on an end of the other shaft body. The lash adjuster 29c employs a mechanism that functions to push out a plunger provided in the lash adjuster 29c toward the cap 29d by utilizing hydraulic pressure of oil supplied through an oil passage P1 only when the exhaust valve 29 is fully closed (minimum lift amount). Thus, any clearance between both the shaft bodies is eliminated by action of the lash adjuster, and both the shaft bodies move in an excellent manner.

A portion (lower portion) of the hole 300B of the middle head 1a" forms, in cooperation with a portion of a hole 300C of the lower head 1a'" which is in communication with the hole 300B, a cylindrical spring accommodation space G3 having an inner diameter greater than that of the lash adjuster 29c. A second spring 307 is incorporated in a bottom face of the spring accommodation space G3. The second spring 307 abuts against a lower retainer 312 fixed to the periphery of the valve shaft 29b, and biases the lower retainer 312 (and the valve shaft 29b) toward the upper cap 310. That is, the second spring 307 biases the exhaust valve 29 in its closing direction (upward direction in FIG. 2).

Below the spring accommodation space G3, a hole having an inner diameter smaller than that of the spring accommodation space G3 passes through the exhaust port 27 from the bottom face of the spring accommodation space G3. A cylindrical valve guide 201 is fixed to an inner periphery of this hole. The cylindrical valve guide 201 supports a portion of the valve shaft 29b extending from the bottom face of the spring accommodation space G3 to the exhaust port 27 such that the portion can advance and retreat along its axial direction.

A valve body 29a fixed to a lower end (the end closer to the exhaust port) of the valve shaft 29b is alternately seated on or separated from a valve seat 200 provided on an open end of the exhaust port 27, thereby opening and closing the exhaust port 27.

A length of the valve shaft 29b in its axial direction is set such that the valve body 29a is located at a medium position (neutral position, hereinafter) between a fully opened displacement position and a fully closed displacement position of the valve body 29a when the armature 305 is held at a medium position between the first core 301 and the second core 302, i.e., when the armature 305 is in its neutral state.

In the exhaust side solenoid driving valve mechanism 31 having the above-described structure, when exciting current is not applied to the first electromagnetic coil 303 and the second electromagnetic coil 304 from the exhaust side driving circuit 31a, a force of the upper spring 306 biasing the armature 305 downward (i.e., in a direction for opening the exhaust valve 29) and a force of the lower spring 307 biasing the armature 305 upward (i.e., in a direction for closing the exhaust valve 29) are applied to the armature 305. The armature 305 is resiliently supported at a position where these biasing forces reach equilibrium, and the armature 305 is held at the neutral position.

When the exciting current is applied to the first electromagnetic coil 303 of the exhaust side solenoid driving valve mechanism 31, an electromagnetic force in a direction for moving the armature 305 toward the first core 301 is generated between the first core 301, the first electromagnetic coil 303 and the armature 305.

When the exciting current is applied to the second electromagnetic coil 304 of the exhaust side solenoid driving valve mechanism 31, an electromagnetic force in a direction for moving the armature 305 toward the second core 302 is generated between the second core 302, the second electromagnetic coil 304 and the armature 305.

That is, in the exhaust side solenoid driving valve mechanism 31, if the exciting current is alternately applied to the first electromagnetic coil 303 and the second electromagnetic coil 304, the armature 305 is moved upward and downward by cooperation of the electromagnetic forces of the electromagnetic coils 303 and 304 and the biasing forces (spring forces) of the springs 306 and 307. Therefore, the valve body 29a is opened and closed. It is possible to control the valve-opening and closing timing (valve timing) and the valve-opening amount of the exhaust valve 29 by changing the energizing timing and magnitude of exciting current applied to the electromagnetic coils 303 and 304, while considering the forces that are applied by the springs 306 and 307 as they are compressed and allowed to expand.

The internal combustion engine 1 of this embodiment includes two exhaust side solenoid driving valve mechanisms 31 on each of the cylinders 21, and two intake side solenoid driving valve mechanisms 30 having substantially the same structure and function as the exhaust side solenoid driving valve mechanisms 31 for driving the intake valves 28 to open and close the intake ports 26.

Figure 3:
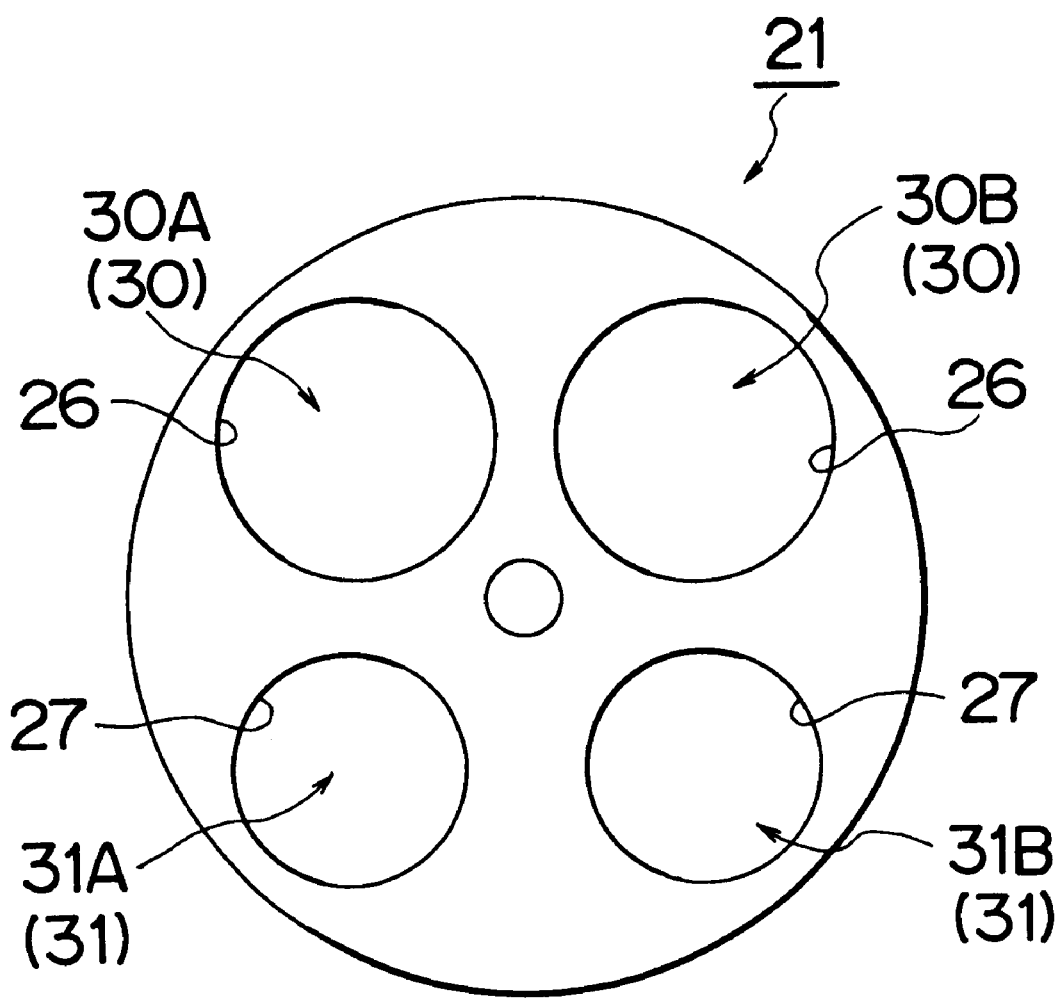
FIG. 3 is a top view schematically showing the layout relation of intake ports and exhaust ports in each cylinder of the internal combustion engine.

FIG. 3 is a schematic top view showing the layout of the intake ports 26 and the exhaust ports 27 which are in communication with each cylinder 21 (and the combustion chamber 24 therein). In all the cylinders 21 provided in the internal combustion engine 1, the layout of the intake ports 26 and the exhaust ports 27 are substantially the same.

As shown in FIG. 3, in the internal combustion engine 1 of this embodiment, two intake ports 26 and two exhaust ports 27 are disposed side-by-side on the top face of the cylinder 21. The intake side solenoid driving valve mechanisms 30 (distinguished as 30A and 30B as a matter of convenience) respectively corresponding to the open ends of the intake ports 26, and the exhaust side solenoid driving valve mechanisms 31 (distinguished as 31A and 31B as a matter of convenience) respectively corresponding to the open ends of the exhaust ports 27 are mounted directly on the respective ports.

An electronic control unit (ECU, hereinafter) 20 for controlling the driving state of the internal combustion engine 1 is provided for the internal combustion engine 1 having the above-described structure (see FIG. 1).

Figure 4:
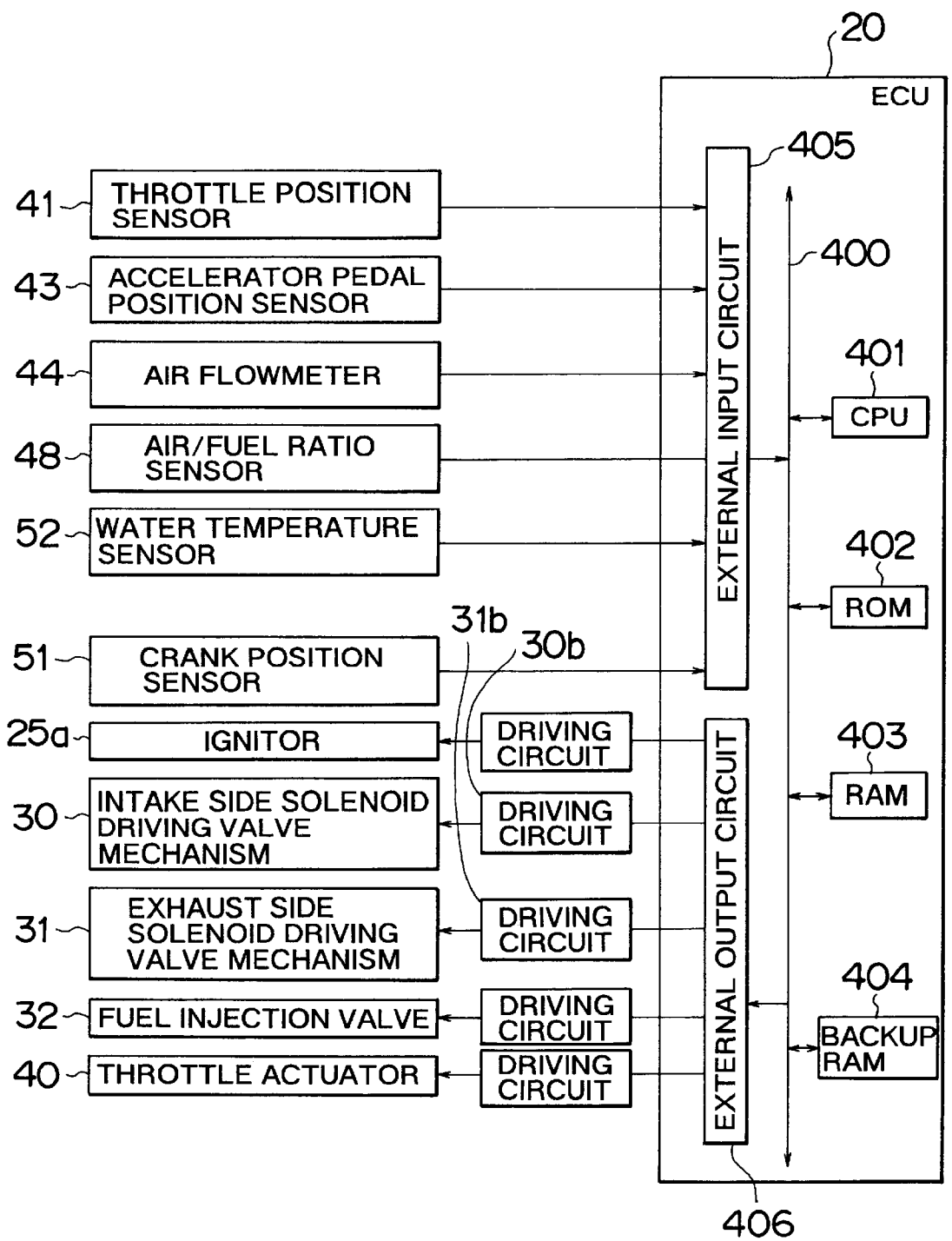
FIG. 4 is a block diagram showing an electrical structure of an ECU.

As shown in FIGS. 1 and 4, connected to the ECU 20 are various sensors such as the throttle position sensor 41, the accelerator pedal position sensor 43, the air flowmeter 44, the air/fuel ratio sensor 48, the crank position sensor 51 and the water temperature sensor 52. These sensors are connected to the ECU 20 through electric wires, and output signals of the sensors are input to the ECU 20.

As shown in FIG. 4, the ignitor 25a, the intake side solenoid driving valve mechanism 30, the exhaust side solenoid driving valve mechanism 31, the fuel injection valve 32 and the like are connected to the ECU 20 through electric wires. Using output signal values of the various sensors as parameters, the ECU 20 actuates and controls the ignitor 25a, the fuel injection valve 32, a driving circuit 30b of the intake side solenoid driving valve mechanism 30 and a driving circuit 31b of the exhaust side solenoid driving valve mechanism 31.

As shown in FIG. 4, the ECU 20 is constituted as a logical operation circuit having a CPU 401, a ROM 402, a RAM 403, a backup RAM 404, an external input circuit (interface) 405 and an external output circuit (interface) 406 which are connected to each other through a bidirectional bus 400.

The external input circuit 405 sends, to the CPU 401 or the RAM 403, output signals of the various sensors such as the throttle position sensor 41, the accelerator pedal position sensor 43, the air flowmeter 44, the air/fuel ratio sensor 48, the crank position sensor 51 and the water temperature sensor 52.

The external output circuit 406 sends control signals output from the CPU 401 to the ignitor 25a, the fuel injection valve 32, the driving circuit 30b of the intake side solenoid driving valve mechanism 30 or the driving circuit 31b of the exhaust side solenoid driving valve mechanism 31.

The RAM 403 stores the results of arithmetic operations performed by the CPU 401 such as data concerning the output signal of each sensor, e.g., the engine revolution number NE calculated based on the output signal of the crank position sensor 51. The various data stored in the RAM 403 is rewritten as latest data whenever the crank position sensor 51 outputs a signal.

The backup RAM 404 is a nonvolatile memory which holds data even after the internal combustion engine 1 is stopped, and learned values concerning various controls and the like are stored in the backup RAM 404.

The ROM 402 stores therein a fuel injection control routine for determining the fuel injection amount, a fuel injection timing control routine for determining the fuel injection timing, an ignition timing control routine for determining the ignition timing of the plug of each cylinder 21, a throttle opening control routine for determining the opening of the throttle valve 39, various known application programs, control maps and the like.

The ROM 402 stores therein a (intake valve) valve-opening amount control routine for opening and closing the intake valve 28 at a desired timing and speed, a (exhaust valve) valve-opening amount control routine for opening and closing the exhaust valve 29 at a desired timing and speed, and a small angle of action control routine and the like. Each of the solenoid driving valve mechanisms 30 and 31 are opened and closed based on command signals output from the ECU 20 in accordance with these control routines.

The ROM 402 of the ECU 20 stores therein various control maps in addition to the above-described application programs. Examples of the maps are a fuel injection amount control map showing a relation between a driving state of the engine 1 and a fuel injection amount, a fuel injection timing control map showing a relation between the driving state of the engine 1 and the fuel injection timing, an ignition timing control map showing a relation between the driving state of the engine 1 and the ignition timing of each spark plug 25, a throttle opening control map showing a relation between the driving state of the engine 1 and the opening of the throttle valve 39, an intake valve opening timing control map showing a relation between the driving state of the engine 1 and the valve-opening timing of the intake valve 28, an intake valve angle of action control map showing a relation between the driving state of the engine 1 and the valve-opening timing (angle of action) of the intake valve 28, an exhaust valve angle of action control map showing a relation between the driving state of the engine 1 and the valve-opening timing of the exhaust valve 29, and an exciting current amount control map showing a relation between the driving state of the engine 1 and the exciting current amount to be applied to the intake side solenoid driving valve mechanism 30 and the exhaust side solenoid driving valve mechanism 31.

At that time, the CPU 401 determines the driving state of the engine 1 using the output signal values of the crank position sensor 51, the accelerator pedal position sensor 43, the air flowmeter 44 and the like as parameters, and executes various control operations in accordance with the determined driving state of the engine 1.

For example, when the CPU 401 determines that the driving state of the engine 1 is in a low or medium load driving region, the CPU 401 controls the throttle opening amount, the fuel injection amount, the opening and closing timing of the intake valve 28, the opening and closing timing of the exhaust valve 29, and the ignition timing so that a lean-bum driving state by an oxygen-excessive mixture (lean air/fuel ratio mixture) is realized.

When the CPU 401 determines that the driving state of the engine 1 is in a high load driving region, the CPU 401 controls the throttle opening amount, the fuel injection amount, the opening and closing timing of the intake valve 28, the opening and closing timing of the exhaust valve 29, and the ignition timing so that a stochiometric driving state by a theoretical air/fuel ratio mixture (stochiometric mixture) is realized.

Here, the driving and controlling operations of the solenoid driving valve mechanisms 30 and 31 executed by the ECU 20 through the driving circuits 30b and 31b will be explained while considering the case of the exhaust side solenoid driving valve mechanism 31.

Figure 5A:
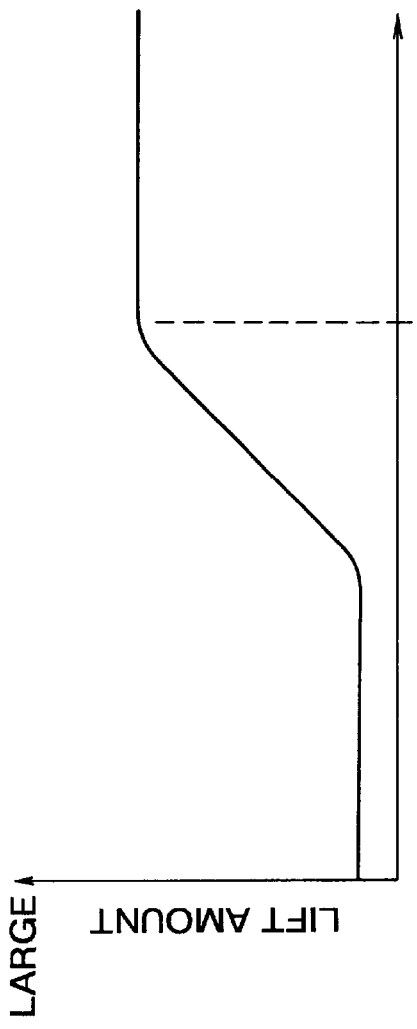
FIG. 5A is a timing chart showing a variation state of a lift amount when an exhaust valve is shifted from its open state to its closed state.
Figure 5B:
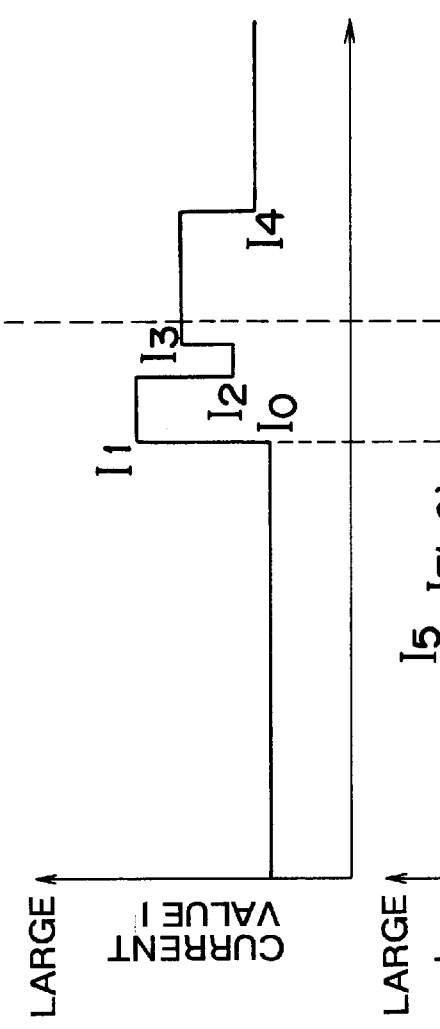
FIGS. 5B and 5C are timing charts showing variation states of exciting current of the exhaust valve with respect to an upper coil and a lower coil.
Figure 5C:
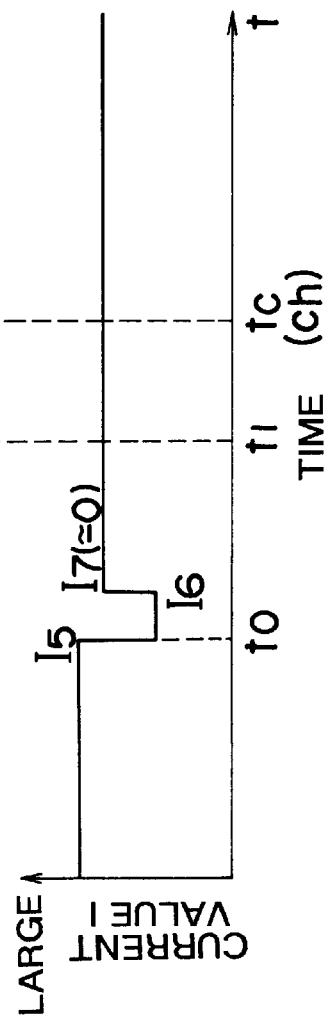

FIG. 5A is a timing chart showing a lift amount variation when the exhaust valve 29 mounted to the exhaust side solenoid driving valve mechanism 31 is shifted from its closed state to its open state. FIGS. 5B and 5C are timing charts showing the variation modes of the exciting current values applied to the second electromagnetic coil 304 and the first electromagnetic coil 303 when the exhaust valve 29 is shifted from its closed state to its open state. The timing charts shown in FIGS. 5A to 5C are represented on the same time axis.

First, as shown in FIG. 5A, the exhaust valve 29 in a state (minimum lift amount) in which the armature 305 abuts (sits on) against the first electromagnetic coil 303 starts moving (displacement) with a predetermined timing. After the exhaust valve 29 is accelerated to some degree, the exhaust valve 29 moves upward at a predetermined speed and thereafter, the exhaust valve 29 is decelerated gradually, and when the exhaust valve 29 is brought into the open state (maximum lift amount), the exhaust valve 29 is stopped. When the exhaust valve 29 reaches the closed position (minimum lift amount), the valve body 29a reaches (sits on) the valve seat 200 in the cylinder 21 and substantially simultaneously, the armature 305 reaches (sits on) the first electromagnetic coil 303.

Next, as shown in FIG. 5B, the current waveform of the exciting current flowing into the second electromagnetic coil 304 through the driving circuit 31b to actuate the exhaust valve 29 is shaped such that a relatively large current value I1 is continued for a predetermined time, the value is once reduced to a current value I2, then a relatively small current value I3 (smaller than I1) is continued for a predetermined time and then, a further smaller current value I4 is maintained.

As shown in FIG. 5C, current flowing into the first electromagnetic coil 303 is maintained at a predetermined current value I5 immediately until the valve-opening operation of the exhaust valve 29 is started. From this state, the current value I5 is lowered to a current value I6, current is allowed to flow in the opposite direction so that the valve-opening operation of the exhaust valve 29 is started. Thereafter, the current value I6 is further changed into a predetermined current value I7 (approximately "0" value).

Even if no current flows into the electromagnetic coils 303 and 304, the spring biasing force for maintaining the armature 305 at the neutral position is still acting. Therefore, in order to hold the exhaust valve 29 at its closed state, it is necessary that the predetermined current value I5 (holding current) flows into the first electromagnetic coil 303. If this holding current is cut off (at time t0), the biasing force of the spring acts as a force for returning the armature 305 to the neutral position, and the valve-opening operation is started. Thereafter, the predetermined current value I1 flows into the second electromagnetic coil 304 at time t1, and the valve-opening operation is accelerated. Thereafter, the current value is once lowered to the predetermined value I2, thereby decelerating the exhaust valve 29, and the valve body 29a and the armature 305 are smoothly seated in their fully open positions (time tc). Immediately before and after the valve body 29a and the armature 305 are seated in their fully open positions, the current value I3 that is slightly greater than the current value I2 flows. Thereafter, the predetermined current value I4 (holding current) for applying, to the second electromagnetic coil 304, a suction force having enough power to overcome the biasing force of the spring which tends to return the armature 305 to the neutral position is maintained until the next valve-closing operation is started.

For the valve-closing operation of the exhaust valve 29, the first electromagnetic coil 303 is energized in the same manner as when the second electromagnetic coil 304 is energized for opening the valve. The second electromagnetic coil 304 is energized in the same manner as the energization of the first electromagnetic coil 303 when opening the valve.

The relation between the energizing manner of the intake side solenoid driving valve mechanism 30 and the operation manner of the intake valve 28 is the same as that of the exhaust side solenoid driving valve mechanism 31. Therefore, a detailed explanation will be omitted here.

Next, concerning the opening and closing operation of the exhaust valve 29, a general outline of the control procedure of a first embodiment of the invention executed by the ECU 20 for controlling the current amount supplied to the electromagnetic coils 303 and 304 will be explained with reference to the FIG. 6 flowchart.

FIG. 6 shows a "valve-opening amount controlling routine" for determining a waveform of current including the current amount (current value), energizing timing and energizing time of exciting current to be supplied to the first electromagnetic coil 303 and the second electromagnetic coil 304.

The valve-opening amount control routine is started simultaneously when I1 is started through the ECU 20, and this routine is periodically executed at predetermined time intervals.

When the valve-opening amount controlling routine is started, the ECU 20 first determines whether a valve-opening request or a valve-closing request of the exhaust valve 29 is made in step S1. If YES, the flow proceeds to step S2, and if NO, the routine ends.

In step S2, the engine revolution number region in which the engine is currently operating is determined, based on the engine revolution number NE. In the first embodiment, if the engine revolution number NE exceeds a preset engine revolution number NE1, it is determined that the engine driving state is in the high revolution region, and if the engine revolution number NE is equal to or smaller than the predetermined engine revolution number NE1, it is determined that the engine driving state is in the medium or low revolution region. In step S2, the ECU 20 also recognizes other parameters representing the driving state such as engine load, for example.

In the subsequent step S3, operation modes are set for the exhaust valves 29, including a target valve-opening timing or a valve-closing timing and displacement speed of the valve bodies 29a, based on the engine revolution number region recognized in step S2 or other parameters representing the driving state.

To realize the operation mode of each of the exhaust valves 29 set in step S3, in the subsequent step S4, a current waveform of exciting current to be supplied to each of the exhaust valves 29 (actuation valves) to be driven is determined. The current waveform of the exciting current refers to the magnitude of the current values I0, I1, I2, I3, I4, I5, I6 and I7, the energization starting timing, switching timing of the current values and the like.

In the subsequent step S5, the exciting current having the determined current waveform is supplied to each of the exhaust side solenoid driving valve mechanisms 31 through the driving circuit 31b (see FIG. 4).

In this routine, each of the exhaust side solenoid driving valve mechanisms 31 provided on each cylinder 21 of the internal combustion engine 1 is allowed to open and close its exhaust valve 29 based on the above procedure.

In each of the intake side solenoid driving valve mechanisms 30, the intake valves 28 driven by the mechanisms 30 on the same cylinder are opened with the same timing irrespective of the engine revolution number NE, and other portions are driven and controlled in accordance with the same control logic as that of the above "valve-opening amount controlling routine".

In the "valve-opening amount controlling routine" concerning each exhaust valve 29, if the current driving state is in the high revolution region when setting the valve-opening timing of the exhaust valve 29 in step S3, the exhaust side solenoid driving valve mechanisms 31A and 31B (see FIG. 3) provided on the same cylinder 21 are opened and closed with the same timing. If the current driving state is in the low or medium revolution region, the exhaust side solenoid driving valve mechanisms 31A and 31B provided on the same cylinder 21 are opened and closed with different timings.

Figure 7:
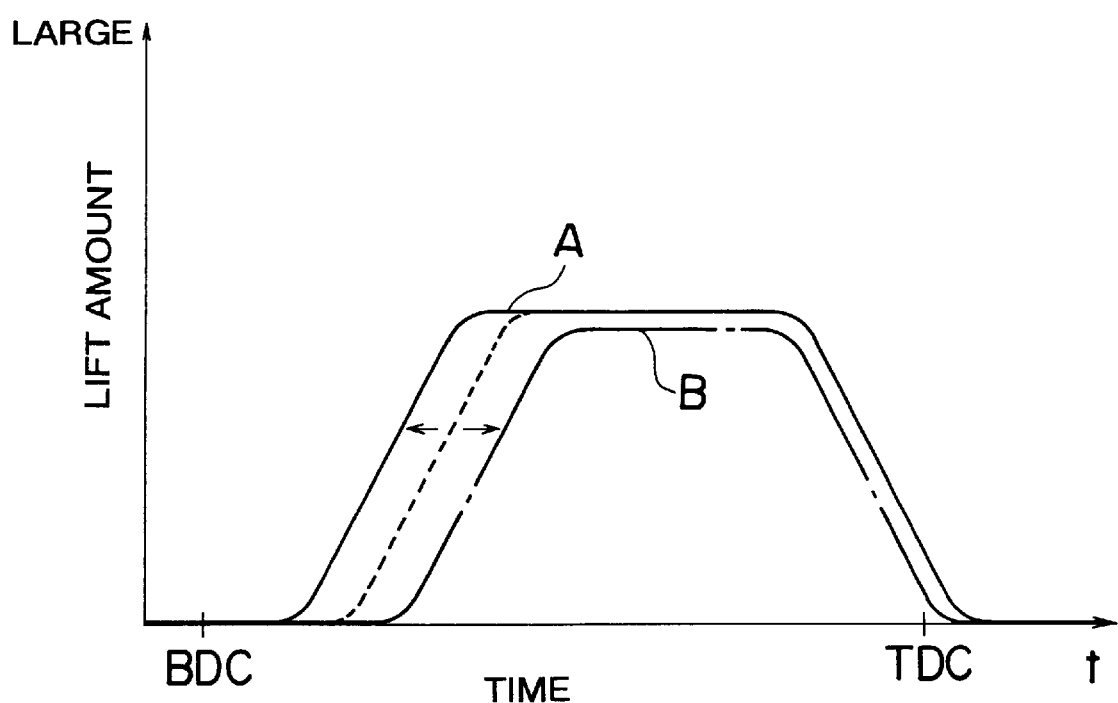
FIG. 7 is a timing chart showing the transition of the lift amount of each exhaust valve on the same cylinder in the low and medium revolution number regions of the first embodiment.

For example, FIG. 7 is a timing chart showing the transition of the lift amount of each exhaust valve 29 driven by the exhaust side solenoid driving valve mechanisms 31A and 31B when the ECU 20 recognizes that the current driving state is in the low and/or medium revolution region. In FIG. 7, a solid line A represents a lift amount transition of the exhaust valve 29 driven by the exhaust side solenoid driving valve mechanism 31A, and a chain line B shows a lift amount transition of the exhaust valve 29 driven by the exhaust side solenoid driving valve mechanism 31B. The timing in which revolution phases of the crankshaft 23 of the cylinder 21 having the exhaust side solenoid driving valve mechanisms 31 (31A, 31B) are at the bottom dead center and at the top dead center are shown on a time axis (lateral axis) as BDC (bottom dead center) and TDC (top dead center), respectively.

As shown in FIG. 7, the exhaust valves driven by the mechanisms 31A and 31B are opened with different timings, and after a predetermined maximum lift amount is maintained, the exhaust valves are closed with the same timing (i.e., the initiation and completion of closing occur at the same time for both valves).

When an exhaust gas discharging mode required to maintain an excellent driving state is achieved by opening the exhaust valves with the same timing by means of the mechanisms 31A and 31B under the same condition, the exhaust valves of both the mechanisms 31A and 31B show a lift amount transition shown with the broken line in FIG. 7. In this case, although the excellent driving state corresponding to the engine revolution number NE is secured, the exhaust ports 27 are abruptly opened in the same manner as when the driving state is in the high revolution region even though the driving state is in the medium and low revolution region. Therefore, the exhaust gas is abruptly discharged from the combustion chamber 24 to the exhaust port 27, and the exhaust noise is adversely increased even in the medium and low revolution region. Further, the exhaust pulsation which is peculiar to the medium and low revolution region is further increased because the exhaust port is abruptly opened.

In this regard, according to the first embodiment, by making the valve-opening timings of the exhaust valves 29 different from each other, it is possible to first open one of the exhaust valves 29 and to open the other exhaust valve 29 when the valve-opening amount of the first-opened exhaust valve 29 reaches a certain value. With such a control, the same effect as that obtained when the exhaust port 27 is gently opened can be obtained, and the exhaust gas is restrained from being discharged abruptly.

Therefore, exhaust pulsation in the medium and low revolution region is excellently restrained, exhaust noise is minimized, and quietness of the engine is improved.

To obtain such an effect, it is unnecessary to change the actuation speed (displacement speed of the valve body) of the solenoid driving valve. The basic action of the valve body of the solenoid driving valve is determined by the natural oscillation generated by the spring forces of the springs. The reliability of control and easiness of the control structure of such a solenoid driving valve are excellent.

In this embodiment, as explained in the above "valve-opening amount controlling routine" (FIG. 6), if the engine revolution number NE is the preset engine revolution number NE1, the ECU 20 recognizes that the current driving state is in the medium and low revolution region, and the ECU 20 controls the valve-opening timing of the two exhaust valves 29 on the same cylinder so as to be different from each other. Alternatively, a plurality of reference engine revolution numbers NE may be set, and the relative valve-opening timing between both the exhaust valves 29 may be changed into a plurality of different delay amounts in accordance with the current engine revolution number NE in or a stepless (continuously variable) manner. In this case, as the engine revolution number NE decreases, a difference in valve-opening timing of both the exhaust valves 29 increases. Further, in addition to the control in which the relative timing of both the exhaust valves 29 is changed uniquely or the timing difference is determined only by the engine revolution number NE, the relative timing of each of the exhaust valves 29 may be controlled in accordance with the amplitude or frequency of the exhaust pulsation estimated during the current driving state by also considering an engine load, a temperature of the cooling water and the like.

The invention is not limited to the internal combustion engine 1 of this embodiment in which two intake valves 28 and the two exhaust valves 29 are provided on the same cylinder. The invention can also be applied to an internal combustion engine having three or more exhaust valves per cylinder. In this case, the relative valve-opening timing of the valves may be controlled appropriately, but if at least an exhaust valve having the quickest valve-opening timing and an exhaust valve having the slowest valve-opening timing are determined, and if the difference of the valve-opening timing of both the valves is controlled in accordance with the engine revolution number NE, the same or similar effect as that of this embodiment can be obtained.

Irrespective of whether the engine has a single cylinder or a plurality of cylinders, and irrespective of the number of cylinders in the case of the engine having the plurality of cylinders, the same or similar effect as that of this embodiment can be obtained by applying the control logic of the "valve-opening amount controlling routine" concerning the exhaust valve if the internal combustion engine has at least a plurality of solenoid driving valves as exhaust valves. For example, the invention can be applied to an engine having exhaust valves which are solenoid driven valves and having an intake valve which is opened and closed by rotation of a camshaft.

Further, the solenoid driving valve mechanisms 30 and 31 employed in this embodiment have the electromagnetic coils located at opposite ends of the moving path of the armature, and apart from this, the solenoid driving valve mechanisms 30 and 31 have structures for biasing the retainers 311 and 312 in opposite directions so as to hold the armature at the neutral position by means of the two springs. On the other hand, each of the solenoid driving valve mechanisms may be formed such that one spring biases a valve or a member moving together with the valve only in one direction along the moving direction of the armature, a restriction member for restricting the movement of the armature is provided on the other side, and an electromagnet is disposed such that the suction (retraction) force is applied to the armature only in a direction opposite from the biasing direction of the spring.

In the solenoid driving valve mechanisms 31 (30) of this embodiment, the valve shaft 29b is divided into two shaft bodies, and the lash adjuster mechanism is provided between both the separated shaft bodies. On the other hand, the valve shaft may merely be separated into two shaft bodies, and ends of both the separated shaft bodies may be abutted against each other appropriately without providing the lash adjuster. Further, the valve shaft may be formed as a single shaft body without forming the separated portions.

Further, the internal combustion engine 1 employed in this embodiment is a so-called four-cycle engine in which fuel is injected and supplied to an intake path (intake port). However, the invention can also be applied to other internal combustion engines, such as an engine having a fuel injection valve 32 for directly injecting fuel to each cylinder, a diesel engine, and a two-cycle engine.

Especially in the case of the internal combustion engine 1 having the solenoid driving valve mechanisms capable of controlling the action of the intake valve or the exhaust valve with high precision like the solenoid driving valve mechanisms 30 and 31 of this embodiment, it is possible to employ a system structure (so-called throttleless system) in which the internal combustion engine 1 is actuated only by the opening and closing operations of the intake valves or the exhaust valves without providing the throttle valve 39.

Next, control of an angle of action of each of the intake valves 28 and exhaust valves 29 in an solenoid driving valve control apparatus of an internal combustion engine according to a second embodiment of the invention will be explained. Since the control methods of the angle of action of the intake valves 28 and the exhaust valves 29 are the same, only the control of the angle of action of the exhaust valves 29 will be explained; explanation of the control of the angle of action of the intake valves 28 will be omitted.

When the exhaust valve 29 is fully closed, the armature 305 of the exhaust side solenoid driving valve mechanism 31 is magnetically attracted toward the first core 301 by the electromagnetic force of the first electromagnetic coil 303. When the exhaust valve 29 is fully opened, the armature 305 is magnetically attracted toward the second core 302 by the electromagnetic force of the second electromagnetic coil 304. While the exhaust valve 29 is held in its fully open state, the armature 305 is in contact with the second core 302 magnetically.

The valve-opening time (angle of action) of each of the two exhaust valves 29 provided on the same cylinder 21 is previously set in accordance with the driving state of the engine 1, and this is stored in the ROM 402 of the ECU 20 as the above-described exhaust valve angle of action controlling map.

Figure 8:
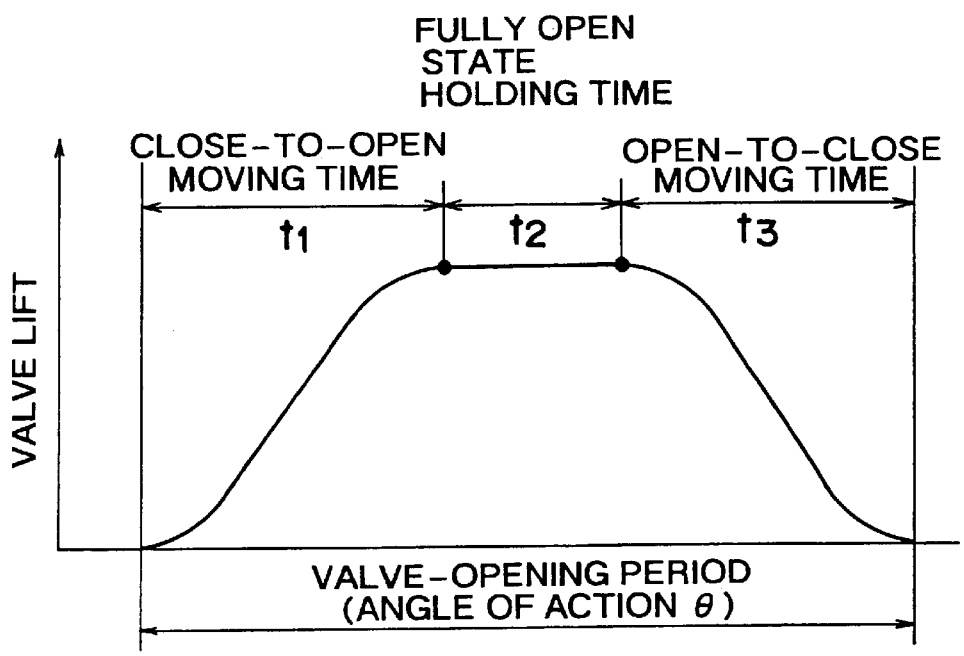
FIG. 8 is a valve lift curve (1) of the exhaust valve.

Usually, the two exhaust valves 29 are opened synchronously. FIG. 8 shows a valve lift curve in which both the exhaust valves 29 are actuated synchronously. In this case, the angle of action θ of the exhaust valve 29 is determined by a sum of a close-to-open moving time t1 during which the exhaust valve 29 moves from the fully closed state to the fully open state, a fully open state holding time t2 during which the exhaust valve 29 is held in its fully open state, and an open-to-close moving time t3 during which the exhaust valve 29 moves from the fully open state to the fully closed state. Since the close-to-open moving time t1 and the open-to-close moving time t3 are constant irrespective of the engine revolution number, if the angle of action θ of the exhaust valve 29 is changed, the fully open state holding time t2 is also changed.

Figure 9:
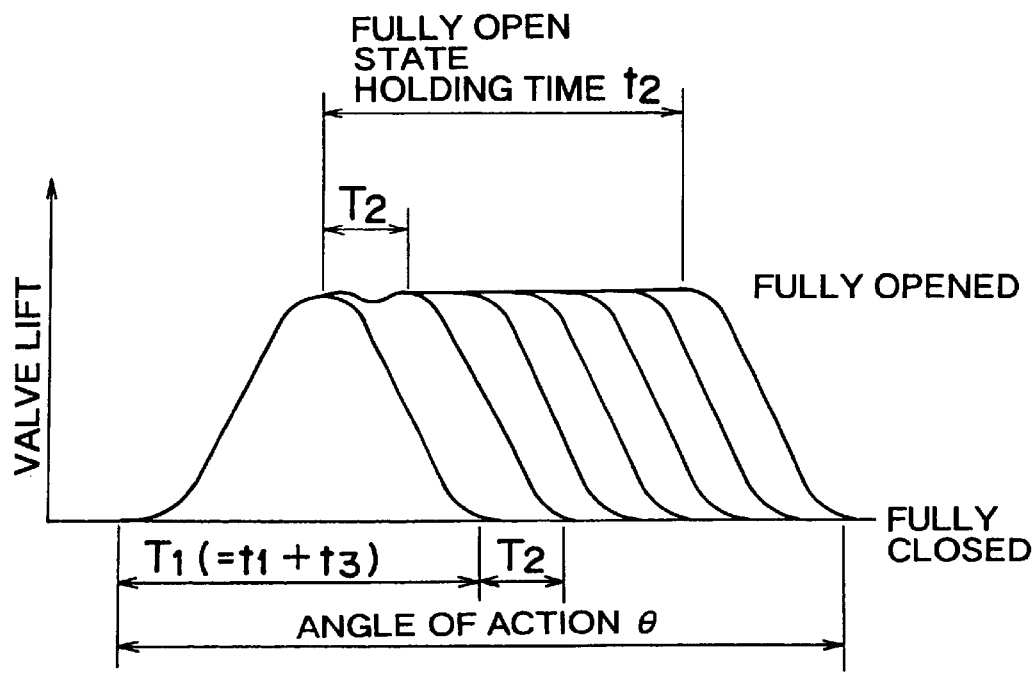
FIG. 9 is a valve lift curve (2) of the exhaust valve.
Figure 10:
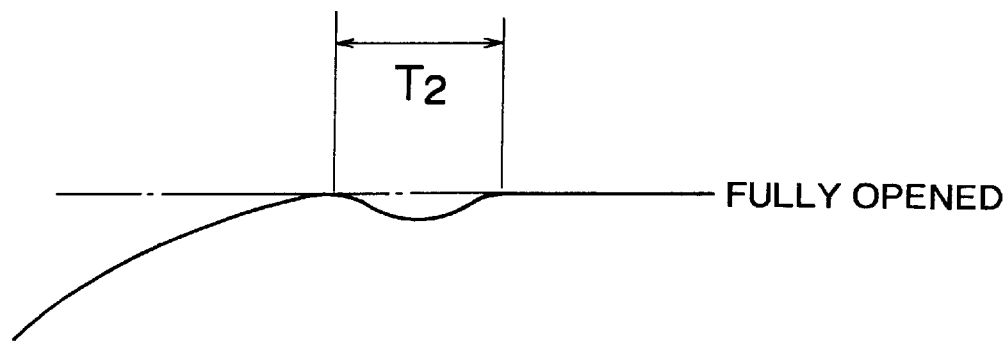
FIG. 10 is a valve lift curve in which a stability-waiting time portion is enlarged.

In the valve-opening operation in which the exhaust valve 29 is shifted from the fully closed state to the fully open state, as shown in FIGS. 9 and 10, the valve lift is unstable immediately after the exhaust valve 29 reaches the fully open state (maximum lift), and a stability-waiting time T2 is necessary until the exhaust valve 29 is stabilized at the maximum lift state. FIG. 10 is an enlarged view of the valve lift curve in the stability-waiting time T2. The reason why the valve lift becomes unstable during the stability-waiting time T2 is that when the exhaust valve 29 is brought into the fully open state, bounce is generated when the armature 305 contacts the second core 302. If the exhaust valve 29 starts closing when the exhaust valve 29 is in the stability-waiting time T2, the valve-closing operation becomes unstable, and it is difficult to control the angle of action θ of the exhaust valve 29.

When the fully open state holding time t2 is set to "0", i.e., when the valve operation is shifted to the valve-closing operation immediately before the exhaust valve 29 reaches the fully open position, it has been confirmed by experiment that the exhaust valve 29 can be stably controlled from the fully opening operation to the fully closing operation. The valve-opening period T1 in this case is a sum of the close-to-open moving time t1 and the open-to-close moving time t3 (T1=t1+t3). Here, the valve-opening period T1 is a time for the minimum angle of action.

Therefore, when both the exhaust valves 29 are opened synchronously, if the valve-opening period of the exhaust valves 29 is defined as Tθ, the exhaust valves 29 can be controlled stable in a range of (i) Tθ=T1 or (ii) Tθ≧T1+T2. However, it is difficult to stably control the exhaust valves 29 in a range of T1<Tθ<T1+T2. Therefore, the valve-opening period of the exhaust valve 29 cannot be set in the range of T1<Tθ<T1+T2.

Figure 11:
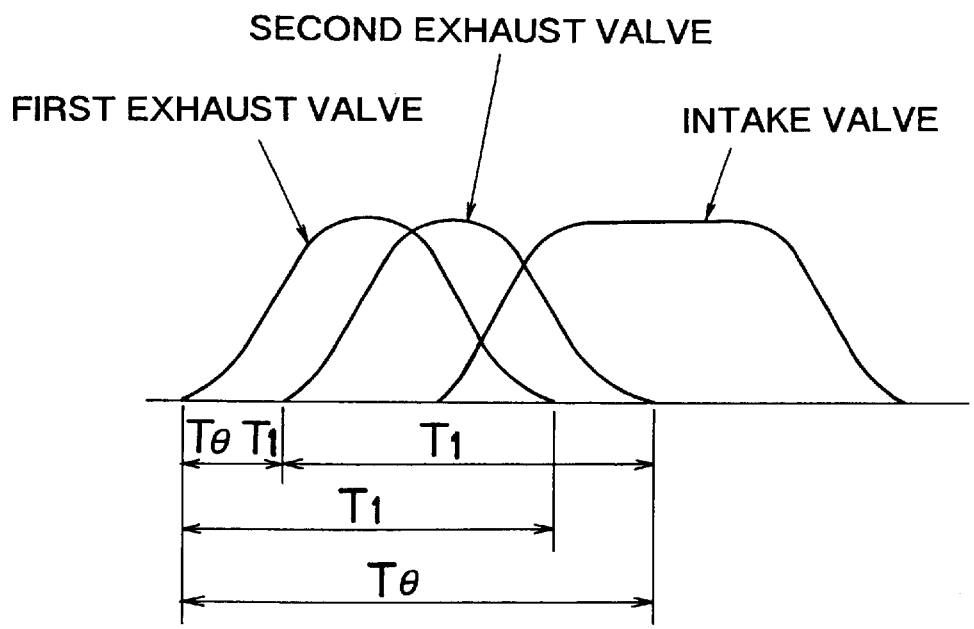
FIG. 11 represents valve lift curves of the intake valve and exhaust valve when control for changing the valve-opening timing of the exhaust valve is executed.

Therefore, in the internal combustion engine of this embodiment, when the valve-opening period Tθ of the exhaust valve 29 is set in the range of T1<Tθ<T1+T2, as shown in FIG. 11, the exhaust valves 29 are controlled such that: (1) the valve-opening timing of the second exhaust valve 29 is delayed by (Tθ−T1) as compared with the valve-opening timing of the first exhaust valve 29, (2) the fully open state holding time t2 of both the exhaust valves 29 are set to "0", and (3) the valve-closing operations of both the exhaust valves 29 are started immediately before the exhaust valves 29 reach the fully open positions.

With such a control process, the valve-opening period Tθ of the exhaust valve 29 can be set in the range of T1<Tθ<T1+T2, and even when the valve-opening period is set in this range, both the exhaust valves 29 can be stably controlled from the valve-opening operation to the valve-closing operation. As a result, for any value of the valve-opening period that is greater than T1, the exhaust valves 29 can freely and stably be controlled.

Next, the angle of action control (small angle of action control, hereinafter) executed while changing the valve-opening periods of the two exhaust valves 29 will be explained with reference to the flowchart of FIG. 12.

Figure 12:
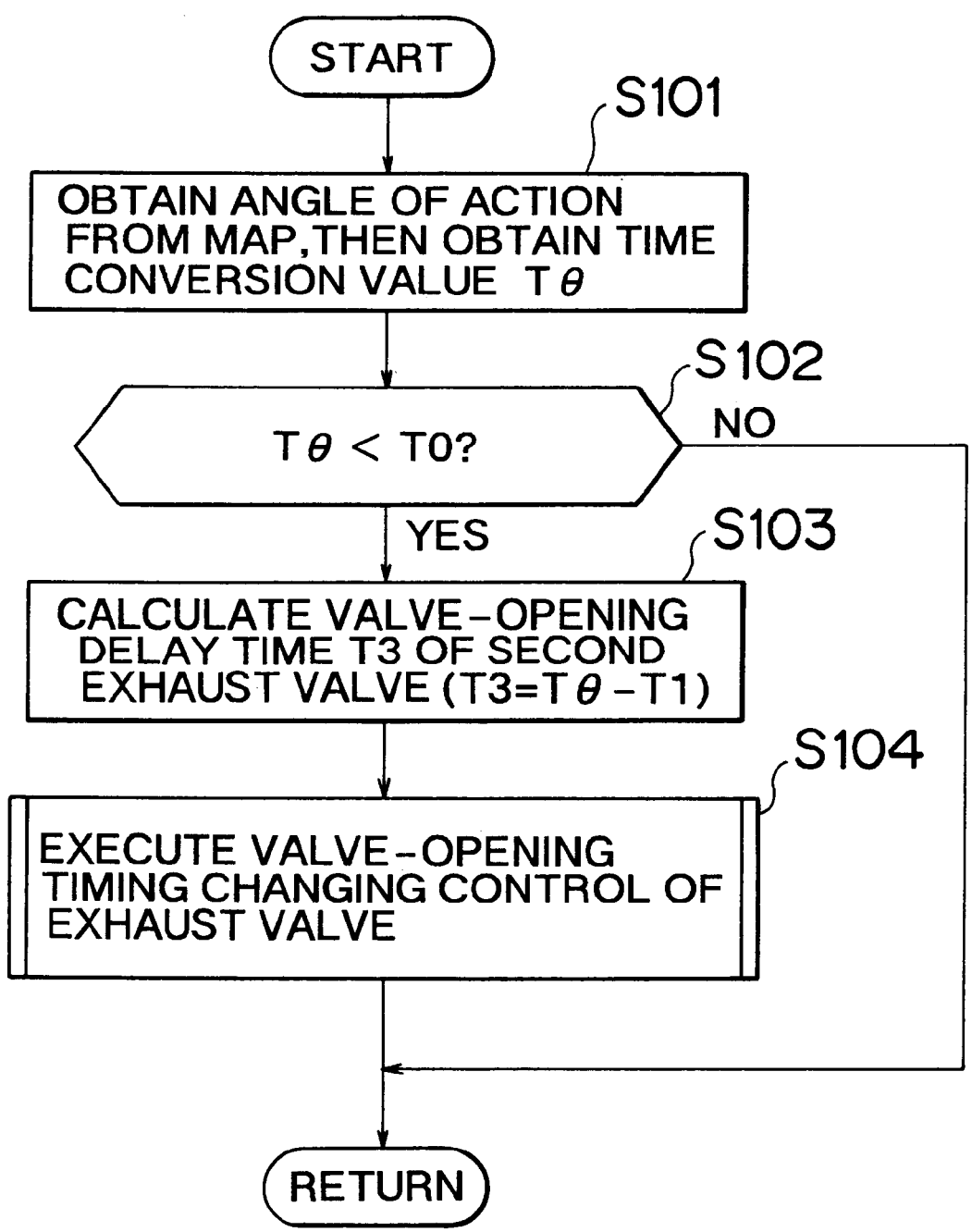
FIG. 12 is a flowchart showing a control routine for changing the valve-opening timing of the exhaust valve according to a second embodiment of the invention.

The CPU 401 executes the small angle of action control routine shown in FIG. 12 for executing the small angle of action control. This small angle of action control routine is previously stored in the ROM 402 of the ECU 20, and is repeatedly executed at a constant time interval by the CPU 401.

First, in step S101, the CPU 401 refers to the exhaust valve angle of action control map of the ROM 402 to obtain a target angle of action of the exhaust valve 29 corresponding to the engine driving state, and obtains a time conversion value Tθ which is obtained by converting the target angle of action into time.

Then, the flow proceeds to step S102, in which the CPU 401 judges whether the Tθ calculated in step S101 is smaller than a predetermined time T0. Here, the predetermined time T0 is a sum of the time conversion value T1 of the minimum angle of action and the stability-waiting time T2 (T0=T1+T2).

When NO in step 102, the execution of this routine is completed. That is, in this case, the normal control is executed to actuate the two exhaust valves 29 with synchronous valve-opening timing.

On the other hand, if YES is determined in step S102, the flow proceeds to step S103, and the CPU 401 obtains the valve-opening delay time T3 from the following equation (1):

$$T3 = T\theta - T1 \quad (1)$$

Next, the flow proceeds to step S104, and the CPU 401 executes the valve-opening timing changing control with respect to both the exhaust valves 29. That is, the valve-opening timing is controlled such that the valve-opening timing of the second exhaust valve 29 is delayed by the valve-opening delay time T3 as compared with the valve-opening of the first exhaust valve 29, and both the exhaust valves 29 are actuated with the minimum angles of action (T1). After this valve-opening timing changing control is executed, the CPU 401 completes the execution of this routine.

Based on the above procedure, in this routine, the exhaust side solenoid driving valve mechanism 31 provided on each of the cylinders 21 of the internal combustion engine 1 is allowed to execute the opening and closing operations of the exhaust valve.

In each of the intake side solenoid driving valve mechanisms 30, the intake valve 28 driven by the mechanism 30 provided on the same cylinder also is driven and controlled in accordance with the above small angle of action control routine.

In the illustrated embodiment, the controller (the ECU 20) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An internal combustion engine comprising:

at least one cylinder that includes at least a first exhaust valve and a second exhaust valve, opened and closed by an electromagnetic force of an electromagnet and a biasing force of a spring;

a detector that detects an engine revolution number of said internal combustion engine; and a timing controller that controls an interval between a first valve-opening timing at which the first exhaust valve starts opening and a second valve-opening timing at which the second exhaust valve starts opening, wherein the second valve-opening timing is different from the first valve-opening timing in accordance with the detected engine revolution number, and wherein the timing controller controls at least one of the first and second valve-opening timings such that the interval between the first and second valve-opening timings increases as the detected engine revolution number decreases.

2. An internal combustion engine according to claim 1, wherein:

the first exhaust valve is an exhaust valve having a fastest valve-opening timing, and the second exhaust valve is an exhaust valve having a slowest valve-opening timing.

3. An internal combustion engine according to claim 1, wherein the timing controller: (a) causes the interval to be equal to zero when the detected engine revolution number is greater than a predetermined reference number; and (b) causes the interval to be greater than zero when the detected engine revolution number is not greater than the predetermined reference number.

4. An internal combustion engine comprising:

at least one cylinder that includes first and second valves that are either first and second intake valves or first and second exhaust valves; and a controller that:

determines a target angle of action for the first and second valves;

determines an interval between a first valve-opening timing at which the first valve starts to open and a second valve-opening timing at which the second valve starts to open, the second valve-opening timing is different from the first valve-opening timing; and controls an angle of action of the first and second valves according to the determined interval between the first and second valve-opening timings in order to obtain the target angle of action, wherein the controller determines whether the target angle of action is smaller than a predetermined value, and causes the interval to be greater than zero only when the target angle of action is determined to be smaller than the predetermined value.

5. An internal combustion engine according to claim 4, wherein:

the controller calculates a first conversion time by converting said target angle of action into time;

the predetermined value is a value obtained by adding to a first time a second conversion time obtained by converting a minimum angle of action into time;

the second conversion time is a sum of a close-to-open moving time and an open-to-close moving time; and the first time is time from an instant when one of the first and second valves reaches a fully open state to an instant when the one valve is stabilized in the fully open state.

6. An internal combustion engine according to claim 5, wherein the controller determines the interval by subtracting the second conversion time from the first conversion time.

7. An internal combustion engine according to claim 4, wherein the first and second valves are controlled such that valve operations of the first and second valves are shifted to valve-closing operations immediately before the first and second valves reach fully open positions during valve-opening operations.

8. An internal combustion engine according to claim 4, wherein the first and second valves are solenoid driving valves which are opened and closed utilizing electromagnetic force.

9. A valve controlling method for an internal combustion engine having at least one cylinder that includes at least a first exhaust valve and a second exhaust valve that are solenoid driving valves, comprising the steps of:

detecting an engine revolution number of the internal combustion engine; and controlling a relative valve-opening timing of the first and second exhaust valves in accordance with the detected engine revolution number, wherein the controlling step controls at least one of the first and second valve-opening timings such that the interval between the first and second valve-opening timings increases as the detected engine revolution number decreases.

10. A method according to claim 9, wherein:

the first exhaust valve is an exhaust valve having a fastest valve-opening timing, and the second exhaust valve is an exhaust valve having a slowest valve-opening timing.

11. A method according to claim 9, wherein the controlling step: (a) causes the interval to be equal to zero when the detected engine revolution number is greater than a predetermined reference number; and (b) causes the interval to be greater than zero when the detected engine revolution number is not greater than the predetermined reference number.

12. A valve controlling method for an internal combustion engine having at least one cylinder that includes first and second valves that are either first and second intake valves or first and second exhaust valves, comprising the steps of:

determining a target angle of action for the first and second valves;

varying a valve-opening timing for the first and second valves such that an interval exists between the valve opening timing of the first and second valves in order to obtain the target angle of action; and determining whether the target angle of action is smaller than a predetermined value, and wherein the varying step causes the interval to be greater than zero only when the target angle of action is determined to be smaller than the predetermined value.

13. A method according to claim 12, wherein the first and second valves are solenoid driving valves which are opened and closed utilizing electromagnetic force.

14. An internal combustion engine comprising:

at least one cylinder that includes first and second valves that are either first and second intake valves or first and second exhaust valves, the first and second valves being opened and closed by an electromagnetic force of an electromagnet and stably controlled from a fully closed state to a fully open state at a certain time period; and a controller that:

determines a target angle of action for the first and second valves in accordance with a driving state of the engine; and controls a first opening timing at which the first valve starts opening and a second opening timing at which the second valve starts opening to produce an interval between the first opening timing and the second opening timing when the target angle of action can not be stably obtained by the first and second valves without the interval between the first and second opening timings.

* * * * *